J. G. WIESEN.
MOUSE TRAP.
APPLICATION FILED MAR. 11, 1912.

1,074,916.

Patented Oct. 7, 1913.

Witnesses

Inventor
John G. Wiesen
By Erwin & Wheeler
Attorneys.

UNITED STATES PATENT OFFICE.

JOHN G. WIESEN, OF MILWAUKEE, WISCONSIN.

MOUSE-TRAP.

1,074,916.  Specification of Letters Patent.  Patented Oct. 7, 1913.

Application filed March 11, 1912. Serial No. 683,082.

*To all whom it may concern:*

Be it known that I, JOHN G. WIESEN, a citizen of the United States, residing at Milwaukee, county of Milwaukee, and State of Wisconsin, have invented new and useful Improvements in Mouse-Traps, of which the following is a specification.

My invention relates to improvements in mouse traps.

The object of my invention is to provide a simple and comparatively inexpensive trap for catching mice and one with which an ordinary fruit jar may be used as a receptacle in which the mice are retained when caught, whereby the cost of the trap thus made will be reduced to the minimum.

My invention is explained by reference to the accompanying drawings, in which—

Figure 1:
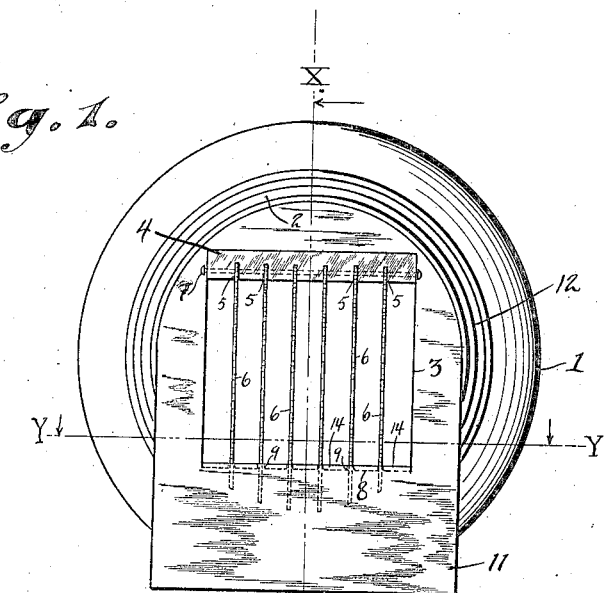
Figure 2:
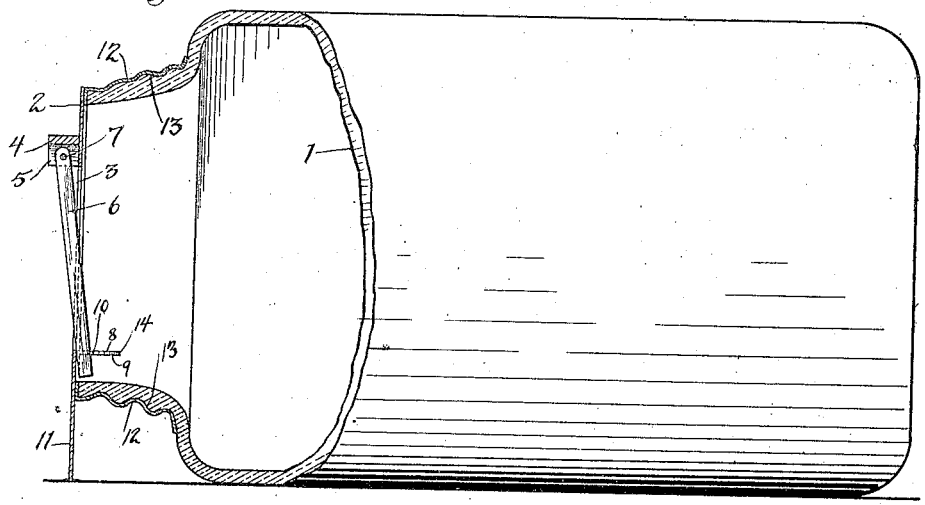
Figure 3:
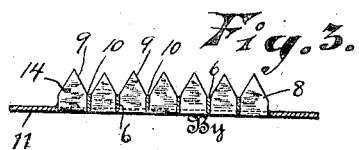

Figure 1 represents a front end view. Fig. 2 is a side view, part in section, drawn on line $x$—$x$ of Fig. 1; and Fig. 3 is a horizontal section, drawn on line $y$—$y$ of Fig. 1.

Like parts are identified by the same reference numerals throughout the several views.

1 represents a receptacle, which is preferably formed of glass and which is like an ordinary fruit jar in construction, and 2 is a retaining cover of the receptacle. The cover 2 is provided with an aperture 3, which is preferably rectangular in shape through which mice are free to enter the jar. To the upper side of the aperture 3 is attached a horizontal bar 4, which bar is provided with a plurality of vertical recesses 5 for the reception of the several vertical bars 6, and said bars 6 are suspended from said bar 4 by the pivotal supporting rod 7. To the lower side of the aperture 3 is attached a horizontal bar 8, which bar 8 is provided with a plurality of angular bearings 9 and vertical recesses 10. The angular bearings 9 converge toward the inner side of the receptacle, whereby the vertical bars 6 are caused to drop of their own gravity into the recesses 10, and whereby the several bars 6 are normally retained parallel to each other across the aperture 3, as indicated in Fig. 1. To the lower side of the cover 2 is attached an angular plate 11, which is adapted to rest upon the floor or other support for the trap, whereby the trap is prevented from rolling and getting out of place when resting upon the floor, shelf, or other support. For convenience of construction, the cover 2 is preferably provided with a threaded flange 12, which is adapted to be turned down upon the threaded neck 13 of the receptacle 1 as the cover is secured in place upon such receptacle.

It will of course be understood that the mice, rats, or other vermin are induced to enter the receptacle by placing attractive food therein, and as they attempt to get the food, they push the pivotally supported bars 6 inwardly and thereby pass freely into the receptacle. When, however, the mice or other vermin enter the receptacle, the bars 6 are free to drop back of their own gravity into the position indicated, when their lower ends are engaged by the recesses 10, and each bar is guided to the proper recess by the angular bearings 9 of the V-shaped projections 14, whereby the mice or other vermin are prevented from escaping. While the V-shaped projections 14 are preferably formed integrally in a single bar, they may of course, if desired, be formed separately and soldered or otherwise secured to the cover of the receptacle.

I claim—

In a device of the described class, the combination of a transparent receptacle open at one end and provided with a threaded collar, a threaded sleeve adapted to fit on said collar, a plate having a horizontal lower edge terminating on the same plane with the lower side of said receptacle adapted to close the open end of said receptacle, said plate being provided with a rectangular aperture, a plurality of vertical bars pivotally suspended at their upper ends independently of each other from the upper side of said opening, a plurality of recesses, one for the reception of the lower ends of each of said bars, a plurality of V-shaped bearings, one located between each pair of vertical recesses, said plate being rigidly connected with the front end of said receptacle and adapted to prevent said transparent receptacle from rolling, all substantially as and for the purpose specified.

In testimony whereof I affix my signature in the presence of two witnesses.

JOHN G. WIESEN.

Witnesses:
JAS. B. ERWIN,
I. D. BREMER.